Sept. 21, 1971  J. N. RICHARDSON  3,606,687
PENDULOUS SYNCHRO LEVEL SENSOR
Filed Jan. 18, 1968  2 Sheets-Sheet 1

INVENTOR.
JOHN N. RICHARDSON
BY
*George B Aupinele*
ATTORNEY

Sept. 21, 1971  J. N. RICHARDSON  3,606,687
PENDULOUS SYNCHRO LEVEL SENSOR
Filed Jan. 18, 1968  2 Sheets-Sheet 2

INVENTOR
JOHN N. RICHARDSON
BY
ATTORNEY

United States Patent Office 3,606,687
Patented Sept. 21, 1971

3,606,687
PENDULOUS SYNCHRO LEVEL SENSOR
John N. Richardson, Hillsdale, N.J., assignor to Singer-General Precision, Inc., Little Falls, N.J.
Filed Jan. 18, 1968, Ser. No. 698,847
Int. Cl. G01c 9/16
U.S. Cl. 33—215                                              1 Claim

ABSTRACT OF THE DISCLOSURE

A module system to determine the tilt of two planes relative to each other and to the Earth horizontal/vertical. A module is affixed to each plane, below the plane. Each module has a resolver with a pendulum attached to the resolver shaft. The output of one module resolver is fed to the other module resolver and the output of the second module resolver then provides the tilt angle.

BACKGROUND OF THE INVENTION

The present invention relates to a module and system which will provide a remote indication of the tilt of a plane under consideration relative to true geophysical horizontal; and/or the relative tilt of one unknown plane to another. The basic singular level sensing module responds only to tilt along a single axis, the direction of which is established by the orientation of the module relative to the unknown plane; however, total or complex tilt may be readily indicated through the use of two modules whose sensing axes are in geometric quadrature.

Measurement of tilt of a near-horizontal plane requires that the axis of tilt be known, or be otherwise established in the course of the measurement. In addition, there must be a known, true reference to which the unknown tilt may be compared; and finally a means whereby the measurements may be interpreted in meaningful digital or analog quantities which define the unknown angle or function thereof.

A familiar method of performing the measurement of tilt is use of a bubble level, which has inherently a gravity reference. However, in most applications, the bubble level is used to verify the horizontal or vertical rather than to measure significant departures therefrom.

Another method is to measure the elevation of two points on a line normal to the tilt axis, and from these two values determine the tilt angle by triangulation.

If the tilt axis is mechanically fixed, as with a hinge, then the tilt may be determined as the arc cosine of the elevation of a measured point divided by the distance from the measured point to the tilt axis. Direct angular indication may be so obtained if the elevation measuring vernier is suitably calibrated in angular units.

Direct angular measurement is also possible if the "trailing edge" of the hinged plane is made to track a protractor-type scale which is placed in close proximity to the plane edge and has a curvature which corresponds to the arc described by the plane edge through its angular excursion.

Alignment of aircraft control surfaces has been done using a protractor scale of large size and transit sightings. The protractor readings are not absolute, as corrections must be made for fore-to-aft inclination of the aircraft assembly; thus additional measurements are required to establish the heretofore unknown inclination thereby providing a reference against which the protractor readings may be compared.

Level sensors using pressure-sensitive or variable reluctance type pickoffs are also in use. Sensitivity and accuracy of such devices are high; but they are, in general, limited to measurement of very small angular differences.

The foregoing methods which have been described fall into two categories, which are: (a) those which determine directly or indirectly the angle of tilt, which angle may vary appreciably over a large range, and (b) those which verify that a predetermined angle is being maintained within acceptable limits, but do not provide for measurement of large angular changes. The bubble level, pressure sensor and reluctance sensor are typical of this second type, and the limitation in angular range is in itself sufficient to exclude their consideration in applications uniquely suited to the pendulous synchro (resolver) sensor described herein.

Measurements by triangulation and/or the protractor system require accessibility of the surfaces being measured, mechanical or line-of-sight linkage to such surfaces, a known reference against which measurements may be compared, elaborate and unwieldy scales and mechanisms, and time-consuming set-up and calibration procedures. An inherent inaccuracy is characterized by the visual-mechanical system itself, but its magnitude may vary greatly. Suffice it to say that the greater the accuracy desired the more precise (and costly) the components, and the more time-consuming the set-up and calibration procedure.

From the foregoing, it will be recognized that:

(a) Surfaces to be measured are not always readily accessible.
(b) Mechanical linkages are not always feasible, and invariably contribute to the overall error.
(c) A suitable known reference plane is not always available. When one is available, its own inaccuracy contributes to the overall error.
(d) Procurement, maintenance, and in-plant storage and transport of unwieldy devices (such as wing-flap protractor scales) is bothersome, costly and time-consuming.

Generally speaking the present invention contemplates a modular system for determining tilt wherein the module includes a base plate designed to be suspended from a plane whose tilt is to be measured, a resolver connected to the plate and supporting a pendulum; stop means on the plate to limit the moving of the pendulum and, screw adjustment means to provide vernier adjustment of the plate and the pendulum stop angle. In the system when the tilt of two planes is to be measured, two modules are used; one as transmitter coupled to the second as a differential. The module can feed into a servo type readout having a synchro responsive to the angular difference; a motor acted on by the synchro, gearing and a feedback line which will bring back the synchro to a null position and digital display means responsive to the motor.

BRIEF DESCRIPTION OF THE DRAWING

The invention as well as other objects and advantages thereof will be more apparent from the following detailed description when taken in conjunction with the accompanying drawing in which.

DETAILED DESCRIPTION

Figure 1:
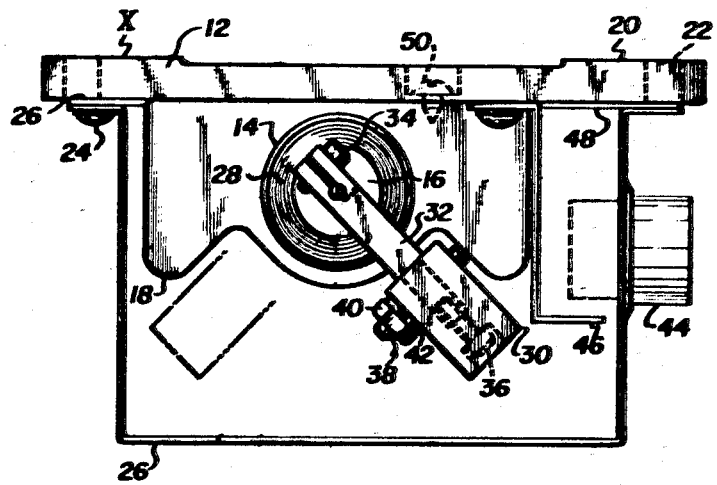
FIG. 1 is a longitudinal cross-sectional view of the module contemplated herein.

Looking first at FIG. 1, the module 10 which has a base plate 12 and supporting structure is a single aluminum casting which incorporates a 4¾ inch by 5 inch base, a mounting recess 14 to accommodate a resolver or synchro 16, and pendulum stop pads 18. Also within the base plate are mounting pads 20, mounting holes 22, tapped holes for securing the housing 26 to the base, and a fill hole for injection of damping fluid.

Angular sensing element 28 is a resolver or synchro 16, transmitter or differential, the choice depending upon application. The transmitter provides direct angular analog of the tilt of a single plane; a transmitter-differential combination; i.e., two separate level sensing modules provides analog of angular difference between two planes.

The sensing element 28 is suitably secured into the mounting recess 14. The pendulum mass 30 is attached to the synchro (or resolver) shaft by means of two stainless steel supporting arms 32 and associated screws 34 and 36.

The mass 30 is made of 416 stainless steel or a similar material the choice being predicited upon the application in which either weight limitation or permissible "hang-off" error are the major controlling factors.

Two pendulum stops 38 are threaded into the holes provided therefor in the mass 30 and adjusted to limit the swing to plus and minus 45°. Other stop angles reasonably close to plus and minus 45° are also obtainable with this adjustment. Stop angles which depart significantly from plus and minus 45° are obtained by alteration of the pendulum stop pads within the base plate and supporting structure. The stop angle, once set, is secured by locking the pendulum stops 38 with a nut 40 and lockwasher 42.

The complete pendulum assembly is locked on the shaft (using screws 34) in such position that the synchro (or resolver) is at electrical zero when surface X is horizontal and the pendulum is hanging "straight down" by gravitational force.

The housing 26 is a rectangular stainless steel enclosure 3½" long x 3" wide x 2⅜" deep having a flange about the open end with holes provided for securing to base 12.

Mounted in the end wall of the housing is a hermetically sealed twist-lock connector 44. The synchro (or resolver) leads are solder connected to the appropriate socket posts on the inner side of the connector.

Directly behind the connector is a stainless steel baffle 46 which serves to prevet the synchro-to-connector wires from interfering with the free movement of the pendulum.

The housing 26 is attached to the base 12 with screws 24. Between flange and base is a neoprene gasket 48 to provide a fluid-tight seal.

The assembled unit is filled with silicone damping fluid of viscosity suited for the application (usually between 100 and 500 centistokes). The base plate fill hole is then closed with a gasket-head screw 50.

OPERATION

Electrical performance is precisely that of a synchro (or resolver) and need not be elaborated upon other than to say that a voltage source (normally 60 or 400 cps.) and angular readout are required to complete the electrical system, but are not an integral part of the level sensing module.

A typical application requires that the module 10 be mounted on an aircraft main wing chord 52 at some unknown plane. The module 10 is suspended under the unknown plane. The axis of tilt must be parallel to the pendulum swing axis.

If a transmitter type module is employed the tilt of the plane may be discerned directly with appropriate readout equipment and represents the departure of the plane from geophysical horizontal.

Comparison of the tilt of two or more aircraft components 52, 54, 56 such as the main wing chord, aileron, and trim tab, in two or more unknown planes requires that a transmitter type module 10 be secured to one plane, and a differential type 58, 60 module be secured to the others. The electrical output of the transmitter module (analogous to the tilt of its associated plane) serves as electrical input to the differential modules. The differential module electrical output is analogous to the angular difference between its electrical input and the tilt of its associated plane; hence the output is an analog of the difference between the tilt angles of the two unknown planes. Since the gravitational reference is common to both the transmitter and the differential module its effect is cancelled in the subtraction of angles within the differential; hence the comparison of the tilt of two or more planes may be made without knowledge of the absolute tilt of either plane considered separately. The only restriction is that the tilt of neither plane may exceed the pre-set stop angle of the module's pendulum.

The differential type module is mechanically similar to the transmitter type module. The major difference is the sensing element 16 which is respectively a differential or a transmitter as defined by synchro (or resolver) convention.

Performance is not limited only to those cases where the unknown plane tilt lies within plus or minus 45° of true horizonal. Other angular values are obtained by mounting the module in a position of mechanical bias, as with precise angular wedges, thus providing means for sensing vertical planes, as well as horiontal, and all angles between the vertical and horizontal reference positions.

Sensing inaccuracy is 10 arc minutes or less. The degree of inaccuracy, over and above that inherent in the synchro or resolver, is due to "pendulum hang-off" which commences at the point where the synchro friction equals the pendulous restoring force. This "hang-off error" is dependent upon, among other things, the pendulous mass and viscous damping, magnitudes of which may be varied to meet application requirements.

Typical application is in the pre-flight alignment of aircraft control surfaces. In such application there exist frame vibrations which tend to "dither" the pendulum with associated members and ball bearings; this tends to "settle" the pendulum and results in accuracy which exceeds that obtainable under static conditions. Actual tests on wing surfaces indicate an angular repeatability within 3 arc minutes or less.

Practical applications of the level sensor are manifold; e.g., in machine tools (lathe beds, milling tables, etc.), road leveling machinery, bridge construction, in addition to aircraft control surface alignment.

Figure 2:
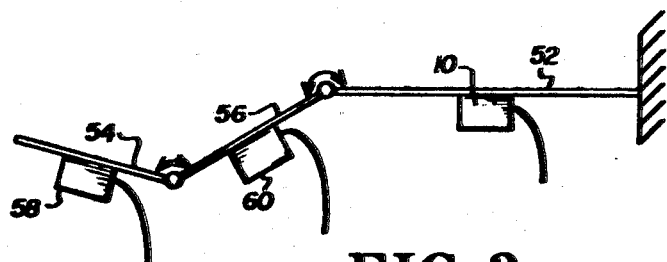
FIG. 2 shows a perspective view of a system using the module of FIG. 1 for aligning aircraft wing surfaces.
Figure 3:
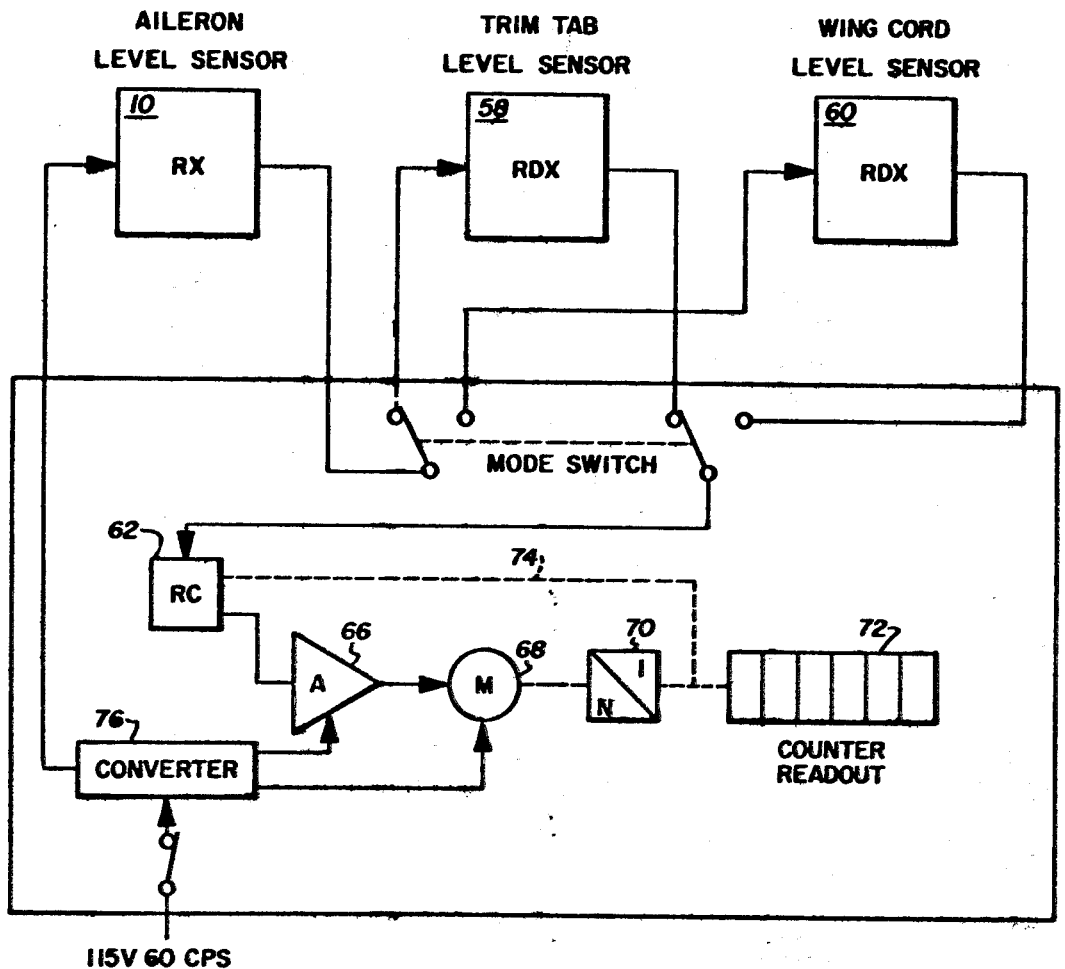
FIG. 3 presents an electronic schematic coupling explanation of the use of the module of FIG. 1 in a system shown in FIG. 2.
Figure 4:
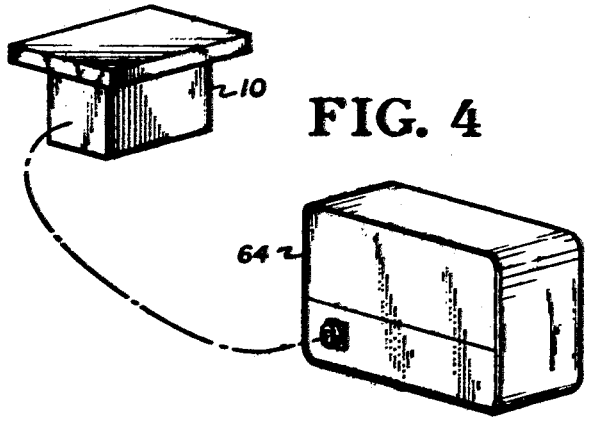
FIG. 4 is a perspective view of the readout display of the information provided by the module of FIG. 1.

When used as shown in FIG. 2, the first module 10 or transmitter RX can sequentially connect to the second modules 58, 60 or differentials RDX. These units act on a synchro 62 (RC) in the readout apparatus 64. The readout display 64 is a typical servo system. The system in the readout apparatus box includes synchro 62 (RC) an amplifier 66 fed by the synchro, a motor 68 and gearing 70 acting on readout counter 72. A feedback line 74 drives back synchro (RC) 62 to a null position. The system may be of the plug-in type to a 115 v. 60 Hertz line using a converter 76. Both the module and the readout may be portable as shown in FIG. 4.

In the present application, the expression synchro is used to denote a three phase module useful in a positioning system and sold commercially under these names. The generic expression is synchro and the resolver is essentially a variable transformer so designed that its coupling coefficient varies as the sine and cosine of its rotor position. When used with a differential resolver, the output of the first resolver (transmitter) is subtracted from the differential resolver. These components have been extensively described; e.g., Kearfott "Technical Information for the Engineer" General Precision, Inc. revised Sept. 1, 1961.

What is claimed is:
1. A system for determining the relative tilt between two plane surfaces comprising:
   a first module for sensing the tilt of one of said surfaces, said first module including a synchro transmitter, a base plate for suspending said module from one of said plane surfaces, said base plate including means for supporting said synchro transmitter, said synchro transmitter including a rotor, a pendulum connected to said rotor for maintaining said transmitter rotor aligned with a local vertical, said synchro supporting means including means for limiting the swing of said pendulum when said one plane surface tilts relative to the local horizontal defined by said local vertical, a hollow enclosure member connected to said base plate for hermetically sealing said synchro transmitter and said pendulum against the outside atmosphere, said first module including means for filling said hollow enclosure member with a damping fluid, said synchro transmitter having an output conductor connected to a terminal located in a sidewall of said enclosure member, and a means suspended inside said enclosure member for preventing interference between said conductor and said swinging pendulum;
   a second module for sensing the tilt of the other of said plane surfaces being identical to said first module but for further including a differential synchro, said base plate suspended from said other plane surface including means for additionally supporting said differential synchro, said first module synchro transmitter output conductor being coupled to an input terminal in a sidewall of said second module's enclosure member for connection therein to said differential synchro, said differential synchro having an output conductor connected to a second terminal in said second module's enclosure member sidewall whereby said last mentioned output conductor carries electrical information indicative of the relative tilt between said first and second modules and therefore between said two plane surfaces;
   a synchro control transformer including an input terminal coupled to said second module's output conductor through said second terminal for receiving said electrical information, said synchro control transformer including a rotor adapted for angular displacement in response to said electrical information, said rotor being coupled to a readout means for indicating said angular displacement and therefore said relative tilt between said two plane surfaces.

References Cited

UNITED STATES PATENTS

| | | | |
|---|---|---|---|
| 3,478,569 | 11/1969 | Aichinger | 33—207 |
| 2,699,612 | 1/1955 | Kellogg | 33—222.75 |
| 2,809,000 | 10/1957 | Brannin | 244—82 |
| 2,983,908 | 5/1961 | Hartman | 33—219 |
| 3,047,962 | 9/1962 | Jorgensen | 33—215.1 |
| 3,241,245 | 3/1966 | Levine | 33—220 |

FOREIGN PATENTS

| | | | |
|---|---|---|---|
| 1,318,726 | 1/1963 | France | 33—204 |
| 508,214 | 1939 | England | 33—215.3 |
| 777,818 | 1957 | England | 33—204 |
| 589,216 | 1924 | France | 33—204 |
| 820,826 | 1956 | England | 244—83 |

LEONARD FORMAN, Primary Examiner

D. A. DEARING, Assistant Examiner

U.S. Cl. X.R.

33—181, 174